US012732786B2

(12) United States Patent
Jeong

(10) Patent No.: US 12,732,786 B2
(45) Date of Patent: Sep. 8, 2026

(54) ELECTRONIC DEVICE FOR CHANGING DEVICE AND METHOD FOR OPERATING THE SAME

(71) Applicant: SAMSUNG ELECTRONICS CO., LTD., Suwon-si (KR)

(72) Inventor: Kyungho Jeong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 247 days.

(21) Appl. No.: 18/228,104

(22) Filed: Jul. 31, 2023

(65) Prior Publication Data

US 2024/0137739 A1 Apr. 25, 2024
US 2024/0236628 A9 Jul. 11, 2024

Related U.S. Application Data

(63) Continuation of application No. PCT/KR2023/010031, filed on Jul. 13, 2023.

(30) Foreign Application Priority Data

Oct. 20, 2022 (KR) ........................ 10-2022-0135555

(51) Int. Cl.
*H04W 4/70* (2018.01)
*H04W 12/06* (2021.01)
(Continued)

(52) U.S. Cl.
CPC ............. *H04W 4/70* (2018.02); *H04W 12/06* (2013.01); *H04W 76/10* (2018.02); *H04W 88/08* (2013.01)

(58) Field of Classification Search
CPC ....... H04W 4/70; H04W 76/10; H04W 12/06; H04W 88/08
(Continued)

(56) References Cited

U.S. PATENT DOCUMENTS 10,200,366 B2 2/2019 Kim et al.
10,447,683 B1 10/2019 Loladia et al.
(Continued)

FOREIGN PATENT DOCUMENTS

EP 3 851 990 A1 7/2021
JP 2017-126191 7/2017
(Continued)

OTHER PUBLICATIONS

International Search Report dated Oct. 11, 2023 in International Patent Application No. PCT/KR2023/010031.
(Continued)

*Primary Examiner* — Mark G. Pannell
(74) *Attorney, Agent, or Firm* — STAAS & HALSEY LLP

(57) ABSTRACT

A method of operating an IoT device comprising receiving a device change request from an IoT server. The method includes releasing a connection between an Internet-of-things (IoT) device and a first device based on receiving the device change request, switching an operation of the IoT device to a pairing mode to establish a wireless communication link, based on the releasing of the connection between the IoT device and the first device. The method includes establishing a wireless communication link between the IoT device and a second device while the IoT device is in the pairing mode. The method includes identifying whether the second device is associated with the device change request, and receiving information about an access point (AP) connecting the second device and the IoT server from the second device based on the second device being identified as being associated with the device change request.

14 Claims, 8 Drawing Sheets

(51) Int. Cl.

| | |
|---|---|
| ***H04W 76/10*** | (2018.01) |
| ***H04W 88/08*** | (2009.01) |

(58) Field of Classification Search

USPC .......................................................... 370/329

See application file for complete search history.

(56) References Cited

U.S. PATENT DOCUMENTS

| | | | | |
|---|---|---|---|---|
| 10,547,731 | B2 | 1/2020 | Kim et al. | |
| 10,560,832 | B2 | 2/2020 | Kang | |
| 11,178,144 | B2 | 11/2021 | Kim et al. | |
| 11,606,838 | B2 | 3/2023 | Han et al. | |
| 2016/0057553 | A1* | 2/2016 | Ryu | H04R 1/1041 340/4.41 |
| 2016/0112433 | A1 | 4/2016 | Chung et al. | |
| 2016/0112434 | A1 | 4/2016 | Chung et al. | |
| 2017/0359762 | A1* | 12/2017 | Yoo | H04W 76/10 |
| 2018/0159855 | A1 | 6/2018 | Ha et al. | |
| 2020/0220878 | A1 | 7/2020 | Chung et al. | |
| 2021/0068194 | A1 | 3/2021 | Han et al. | |
| 2021/0119996 | A1 | 4/2021 | Ha et al. | |
| 2021/0329451 | A1 | 10/2021 | Jun et al. | |
| 2022/0159754 | A1 | 5/2022 | Kim et al. | |
| 2025/0234144 | A1* | 7/2025 | Wilberding | H04L 65/1101 |

FOREIGN PATENT DOCUMENTS

| | | |
|---|---|---|
| JP | 2021-114181 | 8/2021 |
| KR | 10-2018-0065428 | 6/2018 |
| KR | 10-2019-0084584 | 7/2019 |
| KR | 10-2020-0030836 | 3/2020 |
| KR | 10-2201527 | 1/2021 |
| KR | 10-2213640 | 2/2021 |
| KR | 10-2252784 | 5/2021 |
| KR | 10-2255468 | 5/2021 |
| KR | 10-2297475 | 9/2021 |
| KR | 10-2021-0152436 | 12/2021 |
| KR | 10-2022-0129353 | 9/2022 |
| WO | WO 2016/060370 A1 | 4/2016 |
| WO | WO 2022/019682 A1 | 1/2022 |

OTHER PUBLICATIONS

Written Opinion dated Oct. 11, 2023 in International Patent Application No. PCT/KR2023/010031.

Extended European Search Report issued Mar. 28, 2025 for European Application No. 23879941.5.

* cited by examiner

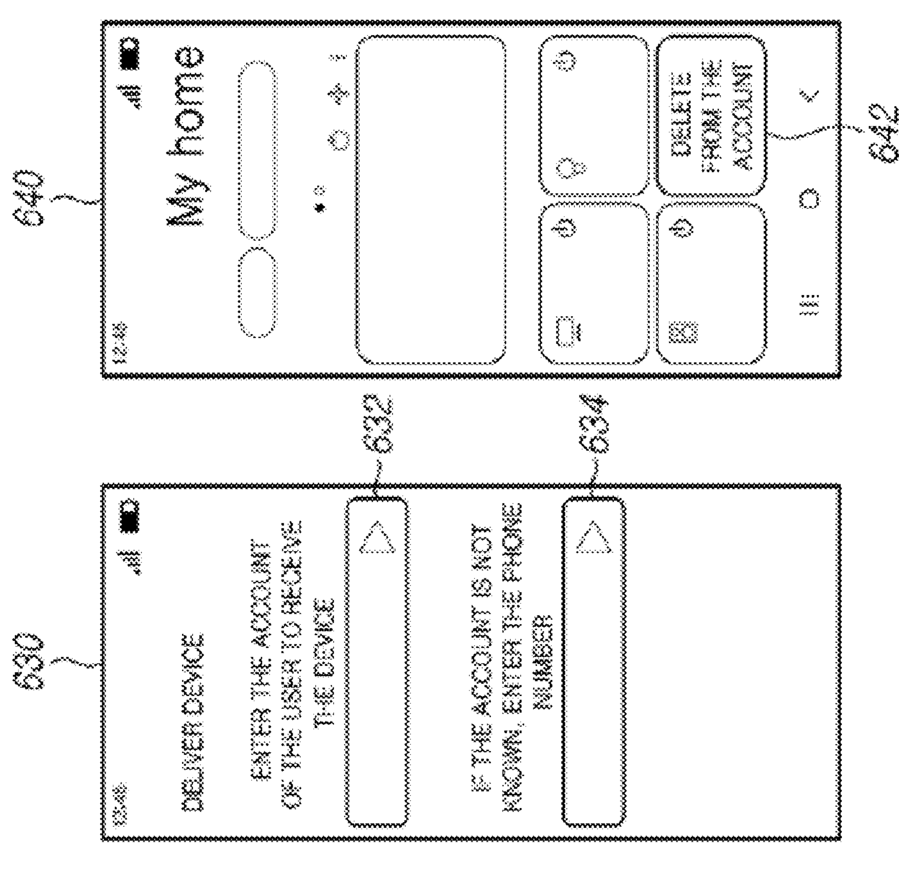
FIG. 6
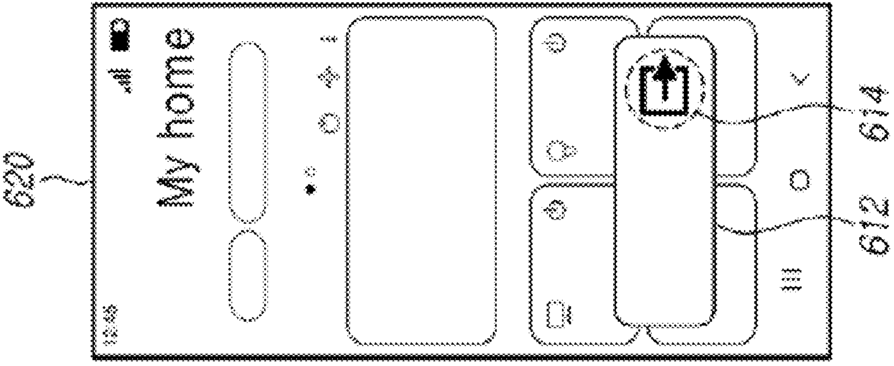
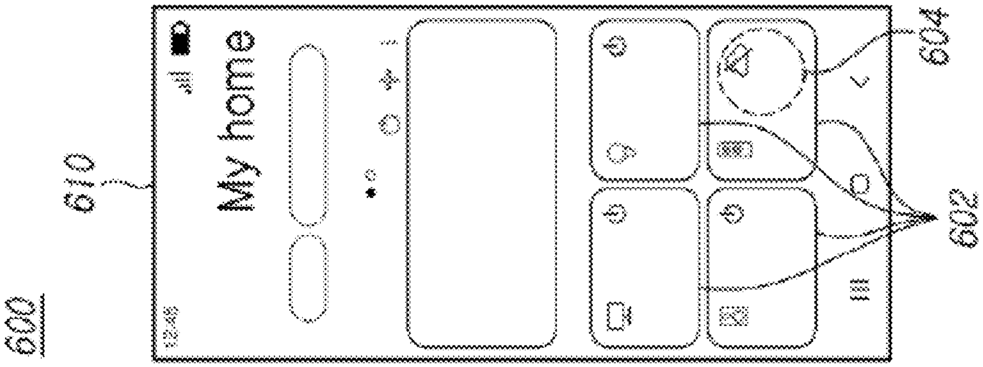

730
732
734
12:45
My home
YOU PURCHASED AN
AIR CONDITIONER,
PRESS HERE TO PRE-
EXPERIENCE THE
PURCHASED
AIR CONDITIONER 700
710
712
720
722
12:45
AIR CONDITIONER
RECEIVED FROM
ANOTHER USER,
PRESS HERE TO ADD
DEVICE
16°
12:45
My home

ELECTRONIC DEVICE FOR CHANGING DEVICE AND METHOD FOR OPERATING THE SAME

CROSS-REFERENCE TO RELATED APPLICATIONS

This application is a continuation application of International Application No. PCT/KR2023/010031 designating the United States, filed on Jul. 13, 2023, in the Korean Intellectual Property Receiving Office, which claims priority from Korean Patent Application No. 10-2022-0135555, filed on Oct. 20, 2022, in the Korean Intellectual Property Office, the disclosures of which are hereby incorporated by reference herein in their entireties.

BACKGROUND

Field

Embodiments of the disclosure relate to an electronic device for changing a device and a method for operating the same.

Description of Related Art

As IoT technology advances, IoT devices (e.g., TVs, refrigerators, vacuum cleaners, washers, smartphones, laptops, etc.) equipped with IoT functionality are widely used in households. Being developed is a technology for monitoring the status of various IoT devices connected in the home inside and outside the home and remotely controlling the IoT devices through a user device. To that end, a specific application is installed on the user device, and IoT devices may be remotely controlled through the application installed on the user device (e.g., welcome cooling, pre-activation of robotic vacuum cleaner, laundry in time for returning home, etc.). As such, to conveniently control the IoT devices, the IoT devices may be registered in an IoT server in association with the user device.

SUMMARY

A method of operating an IoT device according to an embodiment of the disclosure may comprise receiving a device change request from an IoT server. The method according to an embodiment may comprise releasing a connection between the IoT device and a first device based on the receiving of the device change request. The method according to an embodiment may comprise switching an operation of the IoT device to a pairing mode to establish a wireless communication link based on the releasing of the connection between the IoT device and the first device. The method according to an embodiment may comprise establishing a wireless communication link between the IoT device and a second device while the IoT device is in the pairing mode. The method according to an embodiment may comprise identifying whether the second device is associated with the device change request. The method according to an embodiment may comprise receiving information about an access point (AP) connecting the second device and the IoT server from the second device based on the second device being identified as being associated with the device change request.

In an embodiment, the device change request may include information about the second device. The information about the second device may include identification information about the second device and information about an account of a user of the second device.

The method according to an embodiment may further comprise disconnecting the IoT server and the IoT device based on the switching of the operation of the IoT device to the pairing mode.

The method according to an embodiment may further comprise deleting information about the first device stored in the IoT device based on the switching of the operation of the IoT device to the pairing mode.

The method according to an embodiment may further comprise periodically transmitting an advertising packet to at least one adjacent device based on the switching of the operation of the IoT device to the pairing mode.

The method according to an embodiment may further comprise receiving a Bluetooth connection request from the second device. The method according to an embodiment may further comprise transmitting a Bluetooth connection acknowledgment (ACK) to the second device.

The identifying of whether wherein the identifying of whether the second device is associated with the device change request, according to an embodiment, may be based on information about the second device included in the Bluetooth connection request received from the second device and information about the second device included in the device change request.

An electronic device according to an embodiment may comprise a memory, a communication unit, and at least one processor electrically connectable to the memory and the communication unit. The at least one processor may receive a device change request from an IoT server.

The at least one processor according to an embodiment may disconnect a connection between an IoT device and a first device based on the receiving of the device change request. The at least one processor according to an embodiment may switch an operation of the IoT device to a pairing mode to establish a wireless communication link based on the disconnection of the connection between the IoT device and the first device. The at least one processor according to an embodiment may establish a wireless communication link between the IoT device and a second device while the IoT device is in the pairing mode. The at least one processor according to an embodiment may identify whether the second device is associated with the device change request. The at least one processor according to an embodiment may receive information about an access point (AP) connecting the second device and the IoT server from the second device based on the second device being identified as being associated with the device change request.

In an embodiment, the device change request may include information about the second device. In an embodiment, the information about the second device may include identification information about the second device and information about an account of a user of the second device.

The at least one processor according to an embodiment may disconnect the IoT server and the IoT device based on the switching of the operation of the IoT device to the pairing mode.

The at least one processor according to an embodiment may delete information about the first device stored in the electronic device based on the switching of the operation of the IoT device to the pairing mode.

The at least one processor according to an embodiment may periodically transmit an advertising packet to at least one adjacent device based on the switching of the operation of the IoT device to the pairing mode.

The at least one processor according to an embodiment may receive a Bluetooth connection request from the second device. The at least one processor according to an embodiment may transmit a Bluetooth connection acknowledgment (ACK) to the second device.

The at least one processor according to an embodiment may determine that the second device is associated with the device change request based on information about the second device included in the Bluetooth connection request received from the second device and information about the second device included in the device change request.

A method of operating an electronic device according to an embodiment may comprise receiving a device change request from an IoT server. The method according to an embodiment may comprise displaying a notification regarding the device change request based on the receiving of the device change request. The method according to an embodiment may comprise displaying a user interface including an object to receive a user input for a device change. The method according to an embodiment may comprise monitoring a signal transmitted from an IoT device positioned adjacent to the electronic device based on receiving the user input through the object. The method according to an embodiment may comprise transmitting a wireless communication link formation request to the IoT device. The method according to an embodiment may comprise identifying whether the IoT device is associated with the device change request. The method according to an embodiment may comprise transmitting information about an access point (AP) connected with the electronic device.

In an embodiment, the device change request may include information about the IoT device as a target for the device change. The identifying of whether the IoT device is associated with the device change request, according to an embodiment of the method, is based on the information about the IoT device.

The method according to an embodiment may further comprise transmitting a signal to identify a connection state of the IoT device to the IoT server. The identifying of whether the IoT device is associated with the device change request, according to an embodiment of the method, is upon receiving a notification identifying that the connection state of the IoT device is a temporarily connected state from the IoT server.

In an embodiment, the information about the IoT device may include at least one of a serial number, a medium access control (MAC) address, or product type information.

In an embodiment, the wireless communication link formation request transmitted to the IoT device may include identification information about the electronic device.

The method according to an embodiment may further comprise storing the information about the IoT device in a memory of the electronic device based on the transmitting of the information about the AP. The method according to an embodiment may further comprise displaying the user interface including an object indicating that the IoT device is registered.

Effects of the disclosure are not limited to the foregoing, and other unmentioned effects would be apparent to one of ordinary skill in the art from the following description.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates an example user interface for registering an IoT device according to an embodiment.

The same or similar reference denotations may be used to refer to the same or similar elements throughout the specification and the drawings.

DETAILED DESCRIPTION

Figure 1A:
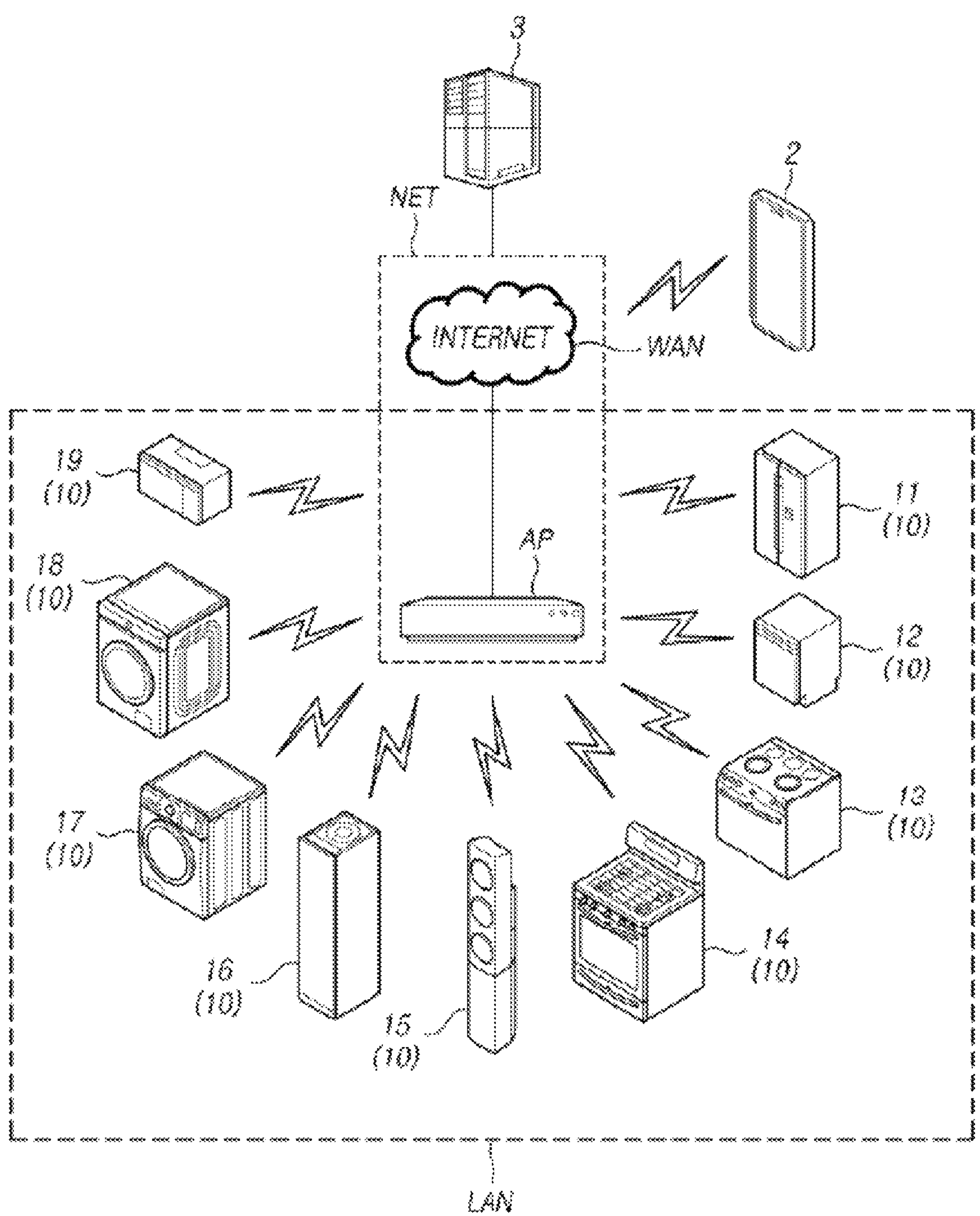
FIG. 1A illustrates an example IoT environment according to an embodiment.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

It will be further understood that the terms "comprise" and/or "have," as used herein, specify the presence of stated features, integers, steps, operations, elements, and/or components, but do not preclude the presence or addition of one or more other features, integers, steps, operations, elements, components, and/or groups thereof.

It will be understood that when a component is referred to as "connected to," "coupled to", "supported on," or "contacting" another component, the components may be connected to, coupled to, supported on, or contact each other directly or via a third component.

Throughout the specification, when one component is positioned "on" another component, the first component may be positioned directly on the second component, or other component(s) may be positioned between the first and second component.

The term "and/or" may denote a combination(s) of a plurality of related components as listed or any of the components.

A user who purchases an IoT device (e.g., as a new or second-hand one) may control the purchased IoT device through the user's terminal (e.g., smartphone). The user may register the IoT device on the account of the remote control application. However, the user needs to install a corresponding application on his smartphone, and an appropriate short-range wireless communication environment, such as Wi-Fi, needs to be created in the home. Further, since the user should alternately manipulate the IoT device and the user device at a short distance to register the IoT device on the user account, a method for registering an IoT device that may bring about a better user experience is required.

Embodiments of the disclosure provide a device and an operation method for registering an IoT device on a user device while minimizing the number of manipulations by the user.

There are also provided a device and an operation method for registering an IoT device on a user account through control of a user device without manipulating the user device and the IoT device both.

The embodiments of the disclosure may enhance user experience by simplifying a registration procedure of an IoT device.

The embodiments of the disclosure may encourage installation of applications to control IoT devices, increasing the prevalence of applications on user devices.

Hereinafter, the working principle and embodiments of the disclosure are described with reference to the accompanying drawings.

FIG. 1A illustrates an example IoT environment according to an embodiment.

The IoT device 10 according to an embodiment may be connected to another IoT device through a network NET, or may be connected to the user device 2 and the server 3.

The IoT device 10 according to an embodiment of the disclosure may include various types of home appliances. For example, the IoT device 10 may include at least one of home appliances such as a refrigerator 11, a dishwasher 12, an electric range 13, an electric oven 14, an air conditioner 15, a clothes care device 16, a washing machine 17, a dryer 18, a microwave oven 19, a robot vacuum, and a vacuum cleaner. The aforementioned home appliances are merely examples, and although not the aforementioned home appliances, any device that may be connected to another home appliance, user device, or server through a network and are capable of performing operations described below may be included in the IoT device 10 according to an embodiment.

The server 3 according to an embodiment may include a communication module capable of communicating with the IoT device 10 and the user device 2, at least one processor capable of processing data received from the IoT device 10 or the user device 2, and at least one memory capable of storing a program for processing data or processed data. The server 3 may be implemented as various computing devices such as a workstation, a cloud, a data drive, and a data station.

The user device 2 according to an embodiment may include a communication module capable of communicating with the IoT device 10 and the server 3, the user interface for receiving the user input or outputting information to the user, at least one processor for controlling the operation of the user device 2, and at least one memory storing a program for controlling the operation of the user device 2.

The user device 2 according to an embodiment of the disclosure may be carried by the user, may be placed in the user's home or office, and may include a personal computer, a terminal, a mobile phone, a smart phone, a handheld device, a wearable device, or the like.

A program for controlling the IoT device 10, in other words, an application, may be stored in the memory of the user device 2 according to an embodiment. The user device 2 may be sold with or without such an application installed thereon. With no application installed on the user device 2, the user may download and install the application from an external server that provides the application.

In an embodiment, the user may control the IoT device 10 by using an application installed on the user device 2. For example, the user may create an account managed by the server 3, and the account of the user may be identified by an ID and a password set by the user. The IoT device 10 may be registered on the user's account according to a predetermined procedure. For example, when the home appliance 10 is registered, identification information such as a serial number or a MAC address allocated to each home appliance 10 may be used. When the application installed on the user device 2 is executed and logged in to the user account, the user may perform desired control on the IoT device 10 using the user device 2.

In an embodiment, the network NET may include both a wired network and a wireless network. The wired network may include a cable network, a telephone network, or the like, and the wireless network may include all networks that transmit and receive signals through radio waves. The wired network and the wireless network may be connected to each other.

In an embodiment, the network NET may include a wide area network (WAN) such as the Internet and a local area network (LAN) formed around an access point (AP).

In an embodiment, the AP may connect a local area network (LAN) to which the IoT device 10 and the user device 2 are connected to a wide area network (WAN) to which the server 2 is connected. The IoT device 10 or the user device 2 may be connected to the server 3 through the wide area network (WAN).

In an embodiment, the AP may communicate with the IoT device 10 and the user device 2 using wireless communication such as Wi-Fi (Wi-Fi™, IEEE 802.11), Bluetooth (Bluetooth™, IEEE 802.15.1), Zigbee (IEEE 802.15.4), or the like, and may access the wide area network (WAN) using wired communication.

In an embodiment, the IoT device 10 may transmit information about its operation or state to the server 3 through the network NET. The information may be transmitted when a request is received from the server 3, when a specific event occurs on the IoT device 10, or periodically or in real-time. When the information about the operation or the state is received from the IoT device 10, the server 3 may update the stored information and transmit the updated information about the operation and the state of the IoT device 10 to the user device 2 through the network NET.

In an embodiment, the IoT device 10 may obtain various pieces of information from the server 3 and provide the obtained information to the user. For example, the IoT device 10 may obtain information such as weather, news, recipe, washing method, etc. from the server 3, and output the obtained information through the user interface.

In an embodiment, the IoT device 10 may operate according to a control command received from the server 3. To that end, the IoT device 10 may obtain prior approval of the user for operating according to the control command of the server 3 without a user input. Further, the IoT device 10 may provide information about the operation or state of the IoT device 10 to the server 3 according to prior approval of the user.

In an embodiment, the user device 2 may provide information about the user (e.g., the user's location or health condition) to the server 3 according to prior approval of the user.

In an embodiment, the server 3 may process the information about the operation or state of the IoT device 10 and the information about the user of the user device 2 using a technology such as artificial intelligence, and may transmit a control command to the IoT device 10 based on the processing result.

Figure 1B:
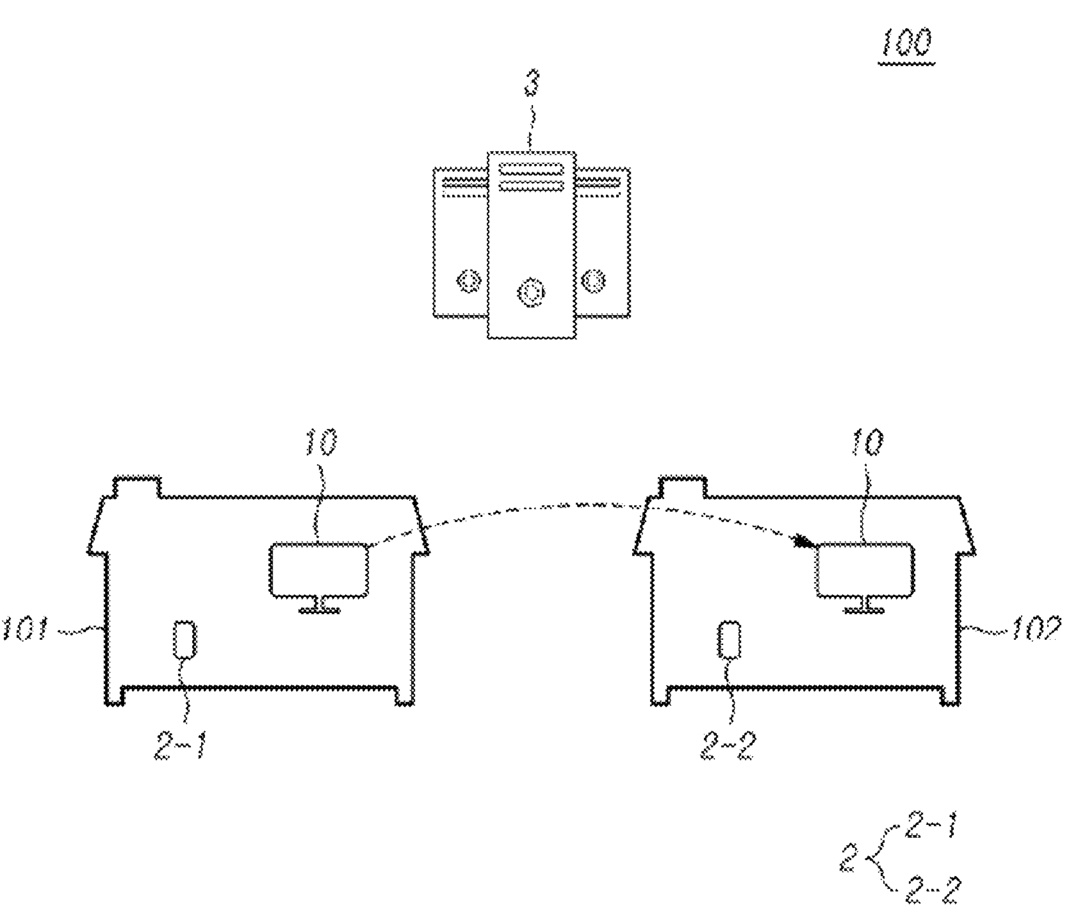
FIG. 1B illustrates an example in which a user of an IoT device is changed according to an embodiment.

FIG. 1B illustrates an example in which a user of an IoT device is changed according to an embodiment.

The IoT environment 100 according to an embodiment may include a server device 3, an IoT device 10, a first device 2-1, and a second device 2-2. In FIGS. 1A, 1B, and the following description, it is assumed that the IoT device 10 is a TV or a monitor, but this is merely an example, and the IoT device 10 may include any one IoT device 10 of FIG. 1A or a device having an IoT function.

In an embodiment, an example in which the IoT device 10 moves from the first household 101 to the second household 102 through, e.g., a second-hand transaction is described. However, this is merely an example, and embodiments according to the disclosure may be equally applied not only to second-hand transactions but also to purchases of new products.

The server device 3 according to an embodiment may represent an IoT network server for managing IoT devices. The server device 3 may perform data communication with an IoT device (e.g., the IoT device 10) and a user device (e.g., the first device 2-1 or the second device 2-2). The server device 3 may perform bidirectional communication with the IoT device and the user device in a wired and wireless manner.

The server device 3 according to an embodiment may communicate with the IoT device. Although not illustrated, an access point (AP) for communicating between the server device 3 and the IoT device may be installed in the first household 101 and the second household 102. The IoT device may communicate with the server device 3 through the AP installed in each household.

The server device 3 according to an embodiment of the disclosure may manage data about IoT devices present in each household. For example, the server device 3 may receive overall data about the IoT device, such as the number of IoT devices (e.g., a total of three IoT devices including a TV, a refrigerator, and a monitor) owned in each household, the types of the IoT devices (e.g., three TVs, two refrigerators, two monitors, one sound bar, and one washing machine), device information (e.g., manufacturer, manufacturing date, software information, and identification information) about the IoT device, connection information (e.g., information about an external device such as a sound bar connected to the TV) about the IoT device, and account information (e.g., logged-in account information) about the IoT device, from the IoT devices or transmit specific data to the IoT devices.

The first device 2-1 according to an embodiment may represent the user's device (e.g., a smartphone) for controlling the IoT device included in the first household 101. The second device 2-2 according to an embodiment may represent the user's device for controlling the IoT device included in the second household 102.

In an embodiment, when the IoT device 10 is connected to the first household 101, the IoT device 10 may be controlled through the first device 2-1, and when the IoT device 10 is connected to the second household 102, the IoT device 10 may be controlled through the second device 2-2.

In an embodiment, the IoT device 10 may be registered in the IoT server 3 to be controlled through an electronic device (e.g., the first device 2-1 or the second device 2-2). For example, the first device 2-1 may register the IoT device 10 in the IoT server 3 through an application installed on the first device 2-1. The second device 2-2 may register the IoT device in the IoT server 3 through an application installed on the second device 2-2.

In an embodiment, the IoT device 10 may be connected to an account of a specific user. For example, when the IoT device 10 is connected to the first household 101, the IoT device may be connected to the account of the user of the first device 2-1. For example, when the IoT device 10 is sold from the first household 101 to the second household 102 and is connected to the second household 102, the IoT device 10 may be disconnected from the account of the user of the first device 2-1 and be connected to the account of the user of the second device 2-2.

Figure 2:
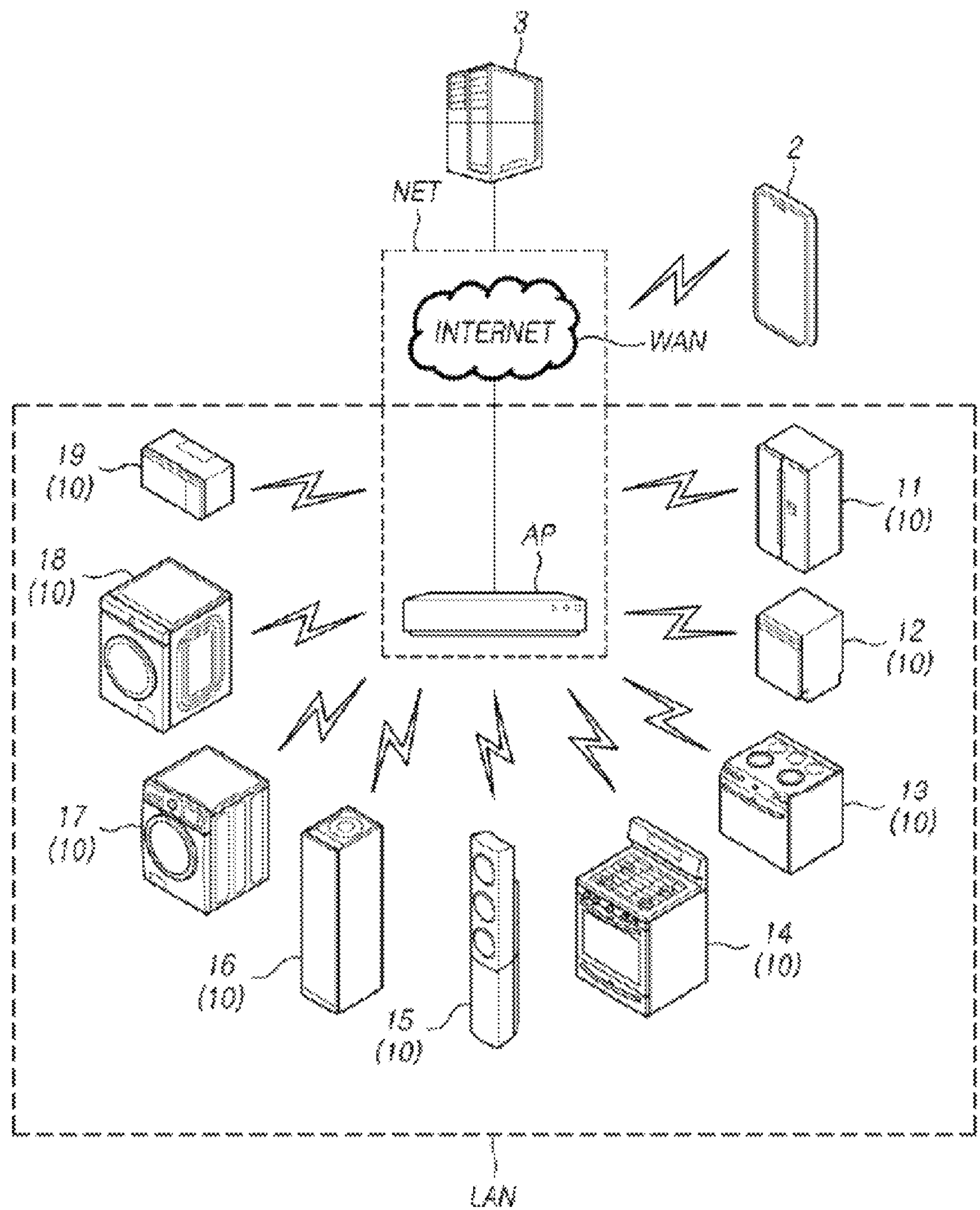
FIG. 2 is a block diagram illustrating a configuration of an IoT device according to an embodiment.

FIG. 2 is a block diagram illustrating a configuration of an IoT device according to an embodiment. The electronic device of FIG. 2 may include an electronic device corresponding to the IoT device 10 of FIG. 1.

According to an embodiment, the IoT device 200 may include a processor 210, a memory 220, a display 240, and a communication unit 250. The IoT device 200 may further include an image input unit (not shown). The IoT device 200 may include additional components other than the illustrated components, or at least one of the illustrated components may be omitted.

According to an embodiment, the memory 220 is a storage medium used by the IoT device 200, and may store data such as at least one instruction 221 or setting information corresponding to at least one program. The program may include an operating system (OS) program and various application programs.

The storage unit 220 may include at least one type of storage medium of flash memory types, hard disk types, multimedia card micro types, card types of memories (e.g., SD or XD memory cards), random access memories (RAMs), static random access memories (SRAMs), read-only memories (ROMs), electrically erasable programmable read-only memories (EEPROMs), programmable read-only memories (PROMs), magnetic memories, magnetic disks, or optical discs.

According to an embodiment, the image input unit (not shown) may receive images and image information through a tuner (not shown), an input/output unit (not shown), or the communication unit 250. The image input unit may include at least one of the tuner and the input/output unit. The tuner may tune and select only the frequency of the broadcast channel to be received by the IoT device 200 among many radio components, by amplifying, mixing, and resonating the broadcast signals wiredly/wirelessly received. The broadcast signal may include video, audio, and additional data (e.g., electronic program guide (EPG)). The tuner may receive real-time broadcast channels (or real-time viewing images) from various broadcast sources, such as terrestrial broadcasts, cable broadcasts, satellite broadcasts, Internet broadcasts, and the like. The tuner may be implemented integrally with the IoT device 200 or may be implemented as a separate tuner electrically connected to the IoT device 200. The input/output unit may include at least one of a high definition multimedia interface (HDMI) input port, a component input jack, a PC input port, and a USB input jack capable of receiving an image and image information from an external device of the IoT device 200 under the control of the processor 210. It is obvious to one of ordinary skill in the art that the input/output unit may be added, deleted, and/or changed according to the performance and structure of the IoT device 200.

According to an embodiment, the display 240 may perform functions for outputting information in the form of numbers, characters, images, and/or graphics. The display 240 may include at least one hardware module for output. The at least one hardware module may include at least one of, e.g., a liquid crystal display (LCD), a light emitting diode (LED), a light emitting polymer display (LPD), an organic light emitting diode (OLED), an active matrix organic light emitting diode (AMOLED), or flexible LED (FLED). The display 240 may display a screen corresponding to data received from the processor 210. The display 240 may be referred to as an 'output unit', a 'display unit', or by other terms having an equivalent technical meaning.

According to an embodiment, the communication unit 250 may provide a wired/wireless communication interface enabling communication with an external device. The communication unit 250 may include at least one of a wired Ethernet, a wireless LAN communication unit, and a short-range communication unit. The wireless LAN communication unit may include, e.g., Wi-Fi, and may support the wireless LAN standard (IEEE802.11x) of the institute of electrical and electronics engineers (IEEE). The wireless LAN communication unit may be wirelessly connected to an access point (AP) under the control of the processor 210. The short-range communication unit may perform short-range communication wirelessly with an external device under the control of the processor 210. Short-range communication may include Bluetooth, Bluetooth low energy, infrared data association (IrDA), ultra-wideband (UWB), and near-field communication (NFC). The external device may include a server device and a mobile terminal (e.g., phone, tablet, etc.) providing, e.g., images.

According to an embodiment, the processor 210 may control at least one other component of the IoT device 200 and/or execute computation or data processing regarding communication by executing at least one command 221 stored in the memory 220. The processor 210 may include at least one of a central processing unit (CPU), a graphic processing unit (GPU), a micro controller unit (MCU), a sensor hub, a supplementary processor, a communication processor, an application processor, an application specific integrated circuit (ASIC), or field programmable gate arrays (FPGA) and may have multiple cores.

Figure 3:
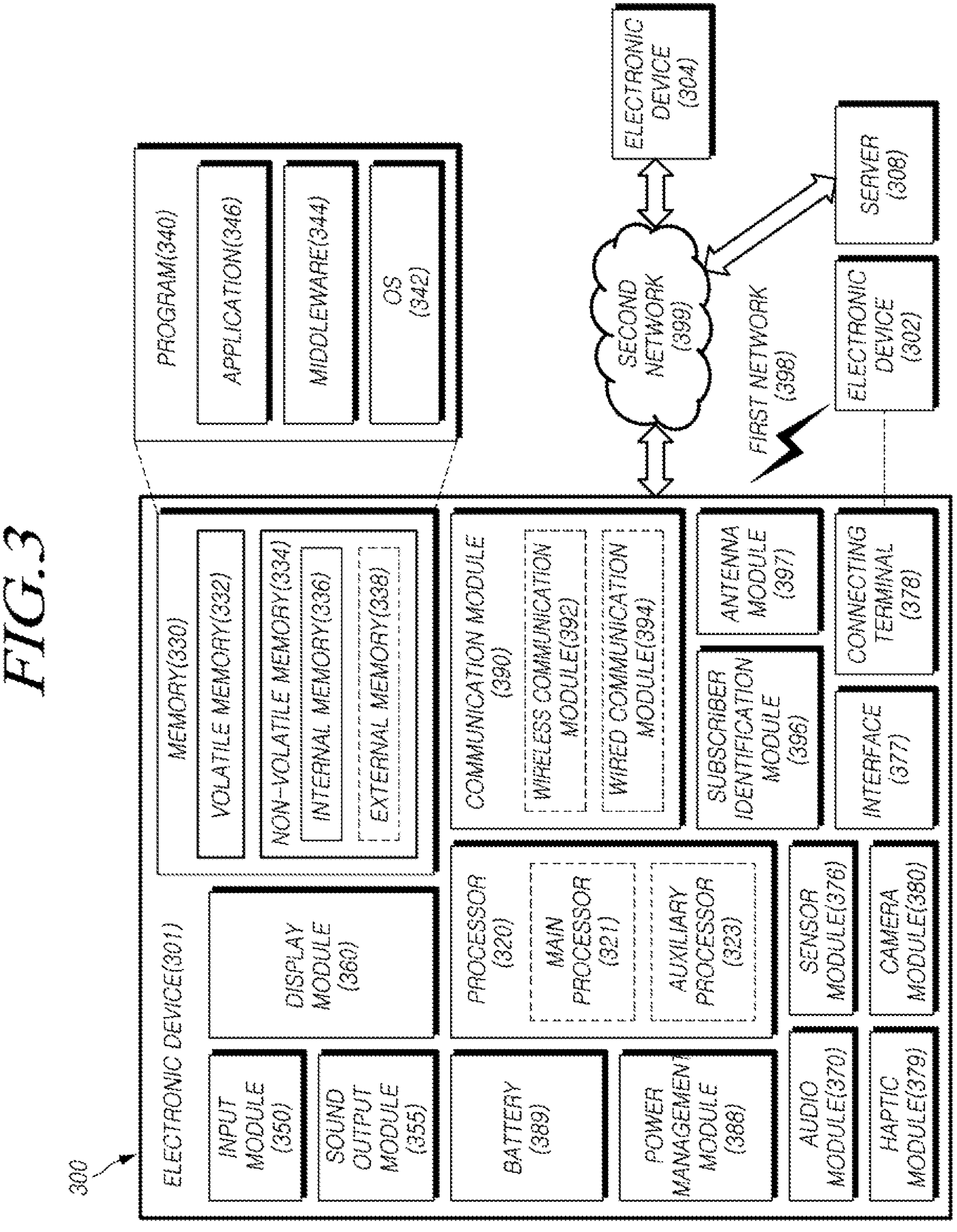
FIG. 3 is a block diagram illustrating a configuration of a user device according to an embodiment.

FIG. 3 is a block diagram illustrating an electronic device 301 in a network environment 300 according to various embodiments. Referring to FIG. 3, the electronic device 301 in the network environment 300 may communicate with an electronic device 302 via a first network 398 (e.g., a short-range wireless communication network), or at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In some embodiments, at least one of the components (e.g., the connecting terminal 378) may be omitted from the electronic device 301, or one or more other components may be added in the electronic device 301. In some embodiments, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., the neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include a touch sensor adapted to detect a touch, or a pressure sensor adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In another embodiment, the external electronic device 304 may include an internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

Figure 4:
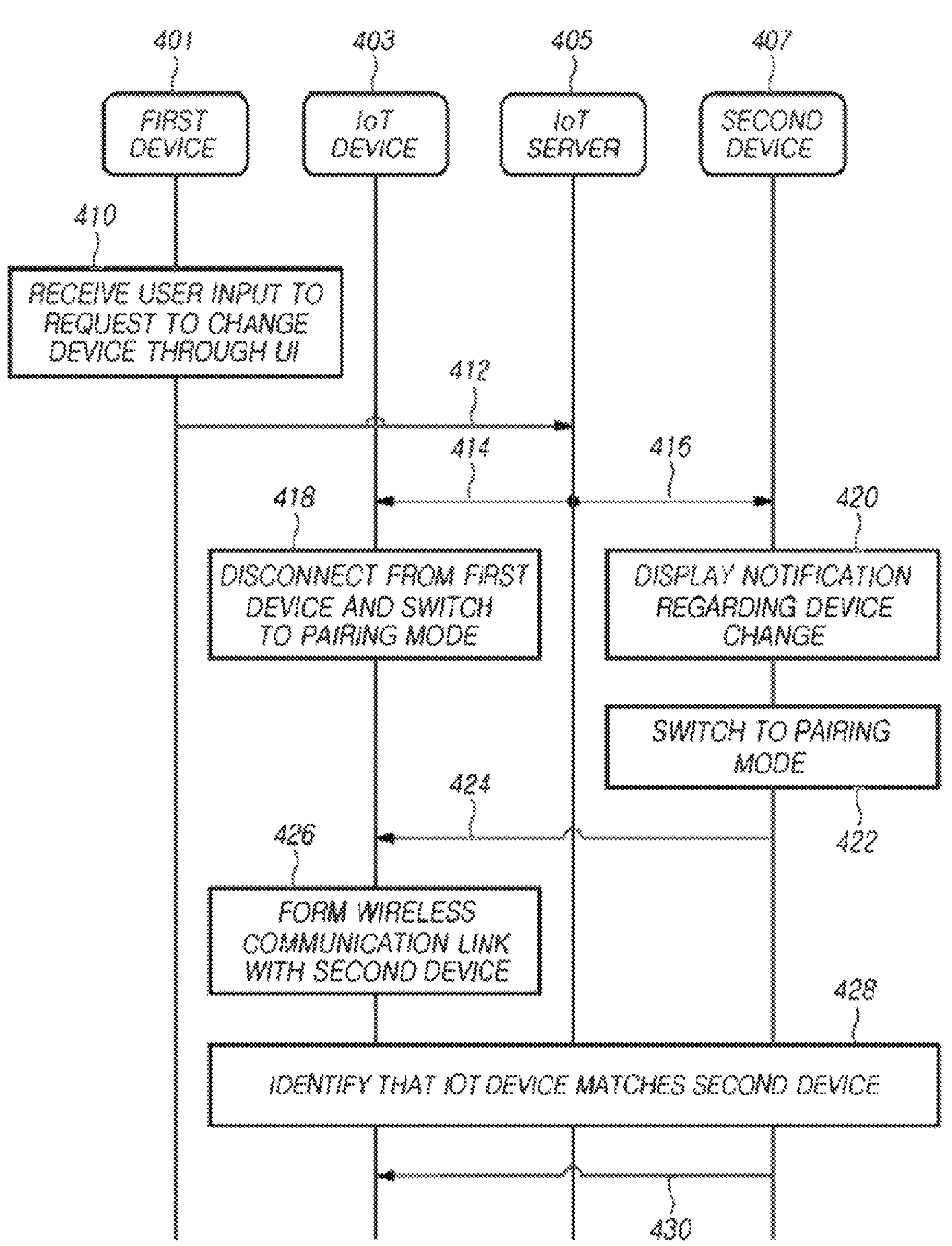
FIG. 4 is a signaling flowchart for registering an IoT device according to an embodiment.

FIG. 4 is a signaling flowchart for registering an IoT device according to an embodiment. The IoT device of FIG. 4 may represent a device corresponding to the IoT device of FIG. 1 and the IoT device 200 of FIG. 2. The first device 401 and the second device 407 of FIG. 4 may represent devices corresponding to the user device 2 of FIG. 1 and the electronic device 300 of FIG. 3. The first device 401 may correspond to the first device 2-1, and may refer to a terminal of a first user who is a user who previously possesses an IoT device. The second device 407 may correspond to the second device 2-2, and may refer to a terminal of a second user who is a user who newly purchased an IoT device. The IoT server 405 of FIG. 4 may represent a device corresponding to the server 3 of FIG. 1.

According to an embodiment, in operation 410, the first device 401 may receive a user input for requesting to change the device through a user interface (UI).

In an embodiment, the UI displayed on the first device 401 may mean a screen of an application for managing IoT devices connected to the user device.

In an embodiment, the UI displayed on the first device 401 may include an object (e.g., an icon, a button, or a pop-up window) for requesting to change the user of the IoT device 403.

In an embodiment, the UI displayed on the first device 401 may include an object for inputting information about a device of a new owner of the IoT device 403, in other words, the second device 407. For example, the UI displayed on the first device 401 may include a window for receiving account information (e.g., an email address, an ID, or the like) about the second device 407, or an object for receiving a phone number.

In an embodiment, the UI displayed on the first device may include an object for selecting the IoT device 403 to be changed.

In an embodiment, when the user input (e.g., the touch, the long press, the double tap, or the like) is received through the object of the UI displayed on the first device 401, the first device 401 may initiate the process for changing the device.

According to an embodiment, in operation 412, the first device 401 may transmit a device change request to the IoT server 405 in response to receiving the user input for requesting the device change through the UI.

In an embodiment, the device change request may include information (e.g., account information, email information, phone number, etc.) about the second device 407 input through the UI of the first device 401.

In an embodiment, the device change request may include information about the IoT device 403.

According to an embodiment, in operation 414, the IoT server 405 may transmit a disconnection request to the IoT device 403.

In an embodiment, the IoT server 405 may transmit the disconnection request to the IoT device 403 in response to receiving the device change request from the first device 401.

In an embodiment, the IoT server 405 may identify the IoT device to which the disconnection request is to be transmitted, based on the information about the IoT device 403 included in the device change request received from the first device 401.

In an embodiment, the disconnection request may include information about the second device 407. For example, the disconnection request may include information about the account of the user of the second device 407, information about a phone number, and the like.

According to an embodiment, in operation 416, the IoT server 405 may transmit a device change request including information about the IoT device 403 to the second device 407 in response to receiving the device change request.

In an embodiment, the information about the IoT device 403 may include information about the serial number (S/N), identification information, the model number, the medium access control (MAC) address, or the like of the IoT device 403.

In an embodiment, when the IoT device 403 does not have a memory, the IoT server 405 may delete information received from the first device 401.

According to an embodiment, in operation 418, in response to receiving the disconnection request, the IoT device 403 may disconnect from the first device 401 and may switch the mode of the device to the pairing mode.

In an embodiment, the IoT device 403 may disconnect from the IoT server 405. For example, when there is a currently connected AP, the IoT device 403 may disconnect from the AP.

In an embodiment, when there is a wireless communication link established with the first device 401, the IoT device 403 may release the wireless communication link.

In an embodiment, when the first user is registered as the connected user, the IoT device 403 may release registration.

In an embodiment, the IoT device 403 may delete information about the first user stored in the IoT device 403.

In an embodiment, the IoT device 403 may switch to the pairing mode to establish a wireless communication link with another device present nearby. For example, the IoT device 403 may switch to the pairing mode to periodically transmit Bluetooth low energy (BLE) advertising packets to adjacent devices. For example, the IoT device 403 may monitor whether there is a request for establishing a wireless communication link received from an adjacent device. For example, the IoT device 403 may activate SoftAP.

In an embodiment, when the disconnection request transmitted in operation 414 includes information about the second device 407, the IoT device 403 may store the received information about the second device 407 in the memory. For example, the received information about the user's account of the second device 407 may be overwritten in the memory.

According to an embodiment, in operation 420, the second device 407 may display a notification regarding a device change. The second device 407 may display a notification about a device change in response to receiving the information about the IoT device.

In an embodiment, the second device 407 may display a UI indicating that the device change request has been received. For example, the second device 407 may display a screen (e.g., a pop-up window, an SMS, or a virtual card in the app) indicating that the device change request has been received. For example, when the application for the IoT service is not installed on the second device 407, a pop-up window including a URL for installing the application may be displayed.

According to an embodiment, in operation 422, the second device 407 may switch to the pairing mode.

In an embodiment, the second device 407 may monitor whether there is an advertising packet received from an adjacent device.

In an embodiment, when there is a received advertising packet, the second device 407 may determine whether the second device 407 is a device corresponding to the IoT device included in the information about the IoT device received from the IoT server 405, based on the device information included in the packet.

According to an embodiment, in operation 424, the second device 407 may transmit a wireless communication link establishment request to the IoT device 403.

In an embodiment, when the second device 407 determines that the second device 407 is a device corresponding to the IoT device included in the information about the IoT device received from the IoT server 405, based on the device information included in the advertising packet received in the pairing mode, the second device 407 may transmit a wireless communication link establishment request to the IoT device.

According to an embodiment, in operation 426, the IoT device 403 may establish a wireless communication link with the second device 407.

According to an embodiment, in operation 428, at least one of the IoT device 403, the IoT server 405, or the second device 407 may identify whether the IoT device 403 matches the second user who is the user of the second device 407.

In an embodiment, the IoT device 403 may determine whether the device establishing the wireless communication link is a device corresponding to the device change request, based on the information about the second device included in the disconnection request. For example, when the information about the second device included in the disconnection request is the information about the second device 407, the second device 407 may be determined as a device corresponding to the device change request. For example, when it is determined that the second device is not the device corresponding to the device change request, a user authentication request may be transmitted to the second device.

In an embodiment, the second device 407 may determine whether the IoT device corresponds to the device which is the target for the device change, based on the information about the IoT device received in operation 416. For example, when the device included in the received information about the IoT device matches the IoT device that has been discovered in the pairing mode and has transmitted the wireless communication link establishment request, the second device 407 may determine that the IoT device is a device corresponding to the device change request. For example, when it is determined that the IoT device is not the device corresponding to the device change request, the second device 407 may transmit a device authentication request to the IoT device requesting to establish the wireless communication link.

In an embodiment, although not illustrated in the drawings, the IoT server 405 may receive, from the second device 407, a signal for requesting to identify whether the IoT device 403 is in a state of being temporarily connected to the IoT server 405 before a wireless communication link is established between the second device 407 and the IoT device 403. If the IoT device 403 is in a state of being temporarily connected to the IoT server 405, the IoT server 405 may determine that the second device 407 matches the IoT device 403. If the IoT device 403 is not in a state of being temporarily connected to the IoT server 405, the IoT server 405 may determine that the second device 407 does not match the IoT device 403. When it is determined that the IoT device 403 does not match the second device 407, the second device 407 may notify the second device 407 that the IoT device 403 does not match, and in response thereto, the second device 407 may request the IoT device 403 to perform a user authentication procedure.

According to an embodiment, in operation 428, the second device 407 may transfer, to the IoT device 403, information (e.g., a Wi-Fi address, etc.) about an access point (AP) used by the second device 407 to communicate with the IoT server 405.

Figure 5:
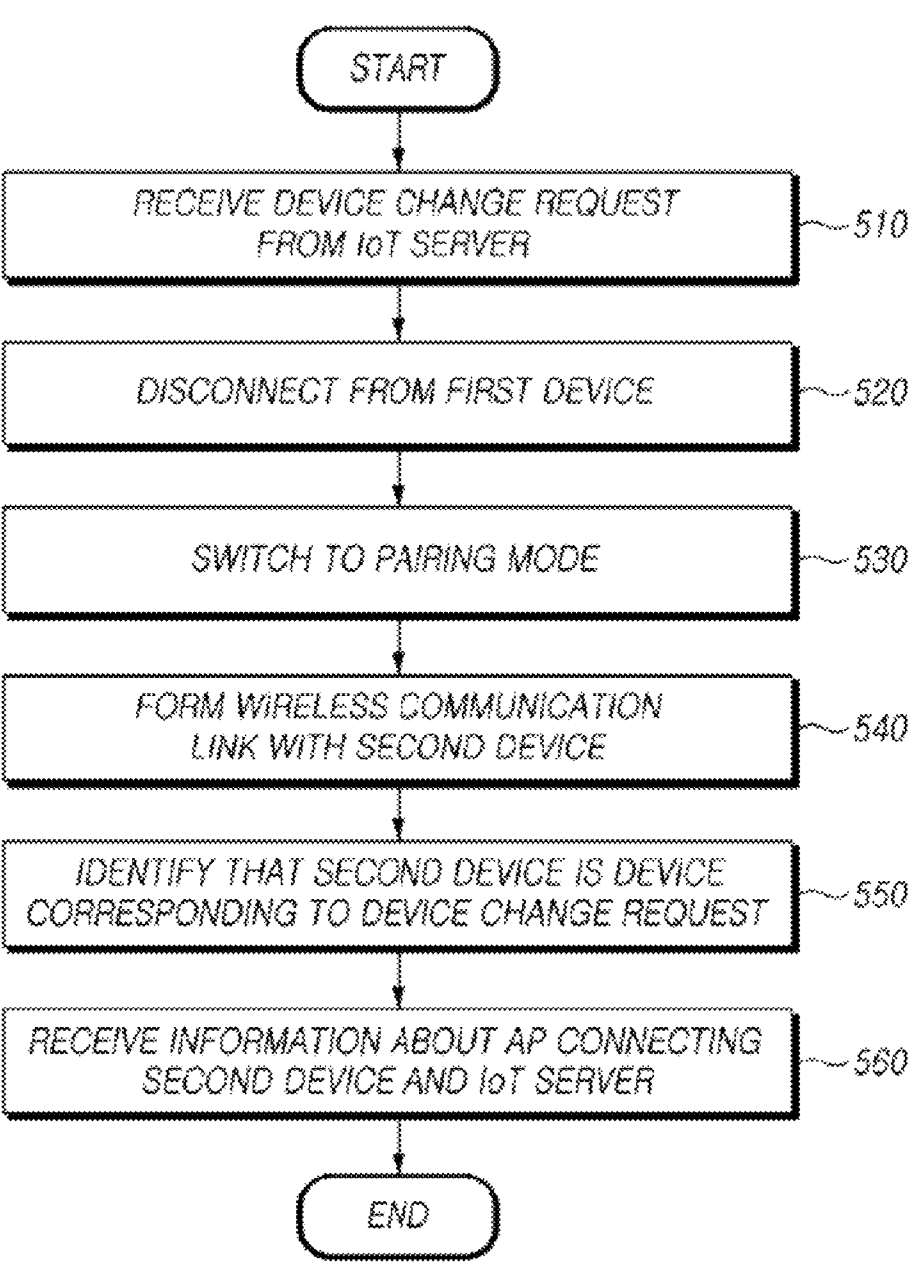
FIG. 5 is a flowchart illustrating operations of an IoT device according to an embodiment.

FIG. 5 is a flowchart illustrating operations of an IoT device according to an embodiment. The IoT device of FIG. 5 may be a device corresponding to the IoT device 10 of FIG. 1, the IoT device 200 of FIG. 2, and the IoT device 403 of FIG. 4. The first device of FIG. may be a device corresponding to the user device 2-1 of FIG. 1B and the first device 401 of FIG. 4. The second device of FIG. 5 may be a device corresponding to the user device 2-2 of FIG. 1B and the second device 407 of FIG. 4. The IoT server of FIG. 5 may be a device corresponding to the server 3 of FIG. 1 and the IoT server 405 of FIG. 4. What is identical to or overlapping the description taken in conjunction with FIG. 4 may be omitted from the description taken in conjunction with FIG. 5.

According to an embodiment, in operation 510, the IoT device may receive a device change request from the IoT server. The operation in which the IoT device receives the device change request from the IoT server may be an operation corresponding to operation 412 of FIG. 4.

In an embodiment, the device change request may include information (e.g., account information, email information, phone number, etc.) about the second device input through the UI of the first device.

In an embodiment, the device change request may include information about the IoT device. For example, information about the serial number S/N, MAC address, etc. of the IoT device may be included.

According to an embodiment, in operation 520, the IoT device may disconnect from a first device in response to receiving the device change request. Operation 520 may indicate an operation corresponding to operation 418 of FIG. 4.

In an embodiment, the IoT device may disconnect from the IoT server. For example, when there is a currently connected AP, the IoT device may disconnect from the AP.

In an embodiment, when there is a wireless communication link established with the first device, the IoT device may release the wireless communication link.

In an embodiment, when the first user is registered as the connected user, the IoT device may release registration.

In an embodiment, the IoT device may delete information about the first user stored in the IoT device.

According to an embodiment, in operation 530, the IoT device may switch to a pairing mode for forming a wireless communication link with another device in response to the disconnection from the first device. Operation 530 may indicate an operation corresponding to operation 418 of FIG. 4.

In an embodiment, the IoT device may switch to the pairing mode to establish a wireless communication link with another device present nearby. For example, the IoT device may switch to the pairing mode to periodically transmit Bluetooth low energy (BLE) advertising packets to adjacent devices. For example, the IoT device may monitor whether there is a request for establishing a wireless communication link received from an adjacent device. For example, the IoT device 403 may activate SoftAP.

According to an embodiment, in operation 540, the IoT device may form a wireless communication link with a second device while the pairing mode is maintained. Operation 540 of FIG. 5 may indicate an operation corresponding to operation 426 of FIG. 4.

According to an embodiment, in operation 550, the IoT device may identify that the second device establishing the wireless communication link is a device corresponding to the device change request. Operation 550 may indicate an operation corresponding to operation 428 of FIG. 4.

In an embodiment, the IoT device may identify whether the second device is a device corresponding to the device change request, based on the information about the second device received from the IoT server.

In an embodiment, the IoT device may receive a signal indicating that the IoT device matches the second device from the second device or the IoT server, and may identify that the second device corresponds to the device change request based on the signal.

According to an embodiment, in operation 560, the IoT device may receive, from the second device, information about the AP connecting the second device and the IoT server. Operation 560 may indicate an operation corresponding to operation 430 of FIG. 4.

FIG. 6 illustrates an example user interface for registering an IoT device according to an embodiment. The user interface of FIG. 6 may be an example of the user interface displayed in operation 410 of the first device 401 of FIG. 4.

According to an embodiment, the user interface 600 may be a user interface displayed when an application for using an IoT service is executed on the user device (e.g., a smartphone).

In an embodiment, the user interface 600 may include a user interface 610, a user interface 620, a user interface 630, and a user interface 640.

In an embodiment, the user interface 610 may include a first object (e.g., an icon or an FAB) indicating at least one IoT device currently interworking with the electronic device. For example, the user interface 610 may include an object 602 indicating an IoT device currently interworking with the electronic device. When a user input is received through the object 602, IoT devices interworking with the electronic device may be controlled (e.g., configured to power on or off or operate at a predetermined time).

In an embodiment, when receiving a user input 604 for an object indicating an IoT device to be sold or removed from among first objects 602 of the user interface 610, the electronic device may display the user interface 620. For example, when the user of the electronic device intends to sell an air conditioner, the user input 604 may be identified through the object 602 indicating the air conditioner. The user input may include various types of inputs such as a tap, a double tap, and a long press.

In an embodiment, when the electronic device identifies the user input 604 through the first object 602, the electronic device may display a second object 612 on the user interface 620. The second object 612 may represent an object for receiving a user input regarding whether to transmit the device change request to the IoT server.

In an embodiment, when receiving the user input 614 through the second object 612, the electronic device may display the user interface 630. The user input 614 may refer to a user input for releasing registration (interworking) of the IoT device currently registered (interworking) in the electronic device and allowing another device to initiate a procedure for registering the IoT device.

In an embodiment, the user interface 630 may include third objects 632 and 634 for inputting information about a device (e.g., the second device 407) of the user to receive the IoT device. For example, the third object 632 may represent the object for receiving information about the account of the user to receive the IoT device. For example, the third object 634 may represent the object for receiving identification information (e.g., the phone number) of the device of the user to receive the IoT device.

In an embodiment, when the electronic device receives information about the user or the device of the user through the third objects 632 and 634 displayed on the user interface 630, the electronic device may display the user interface 640.

In an embodiment, the user interface 640 may display information 642 indicating that the IoT device is registered and released, in a portion corresponding to the IoT device selected to release the registration of the first object 602.

Figure 7:
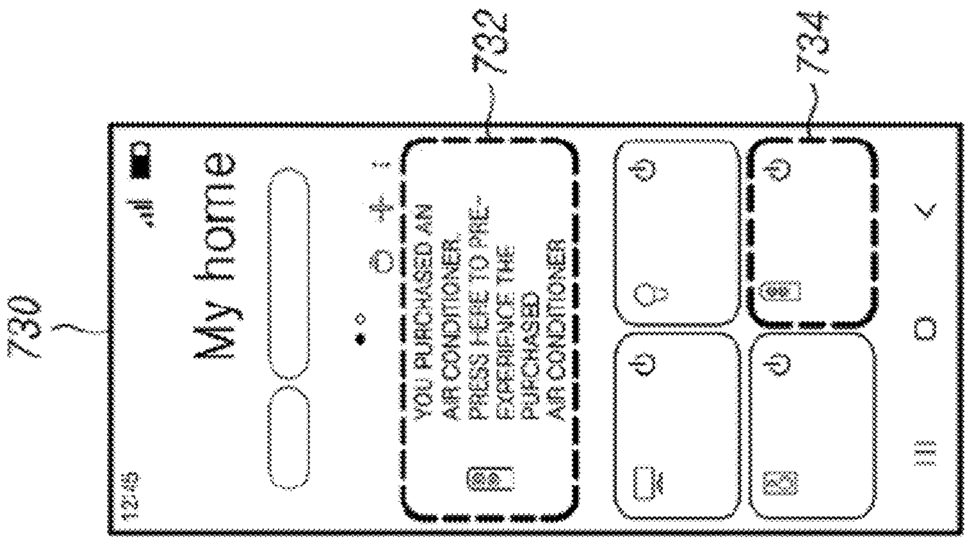
FIG. 7 illustrates an example user interface for registering an IoT device according to an embodiment.
Figure 7:
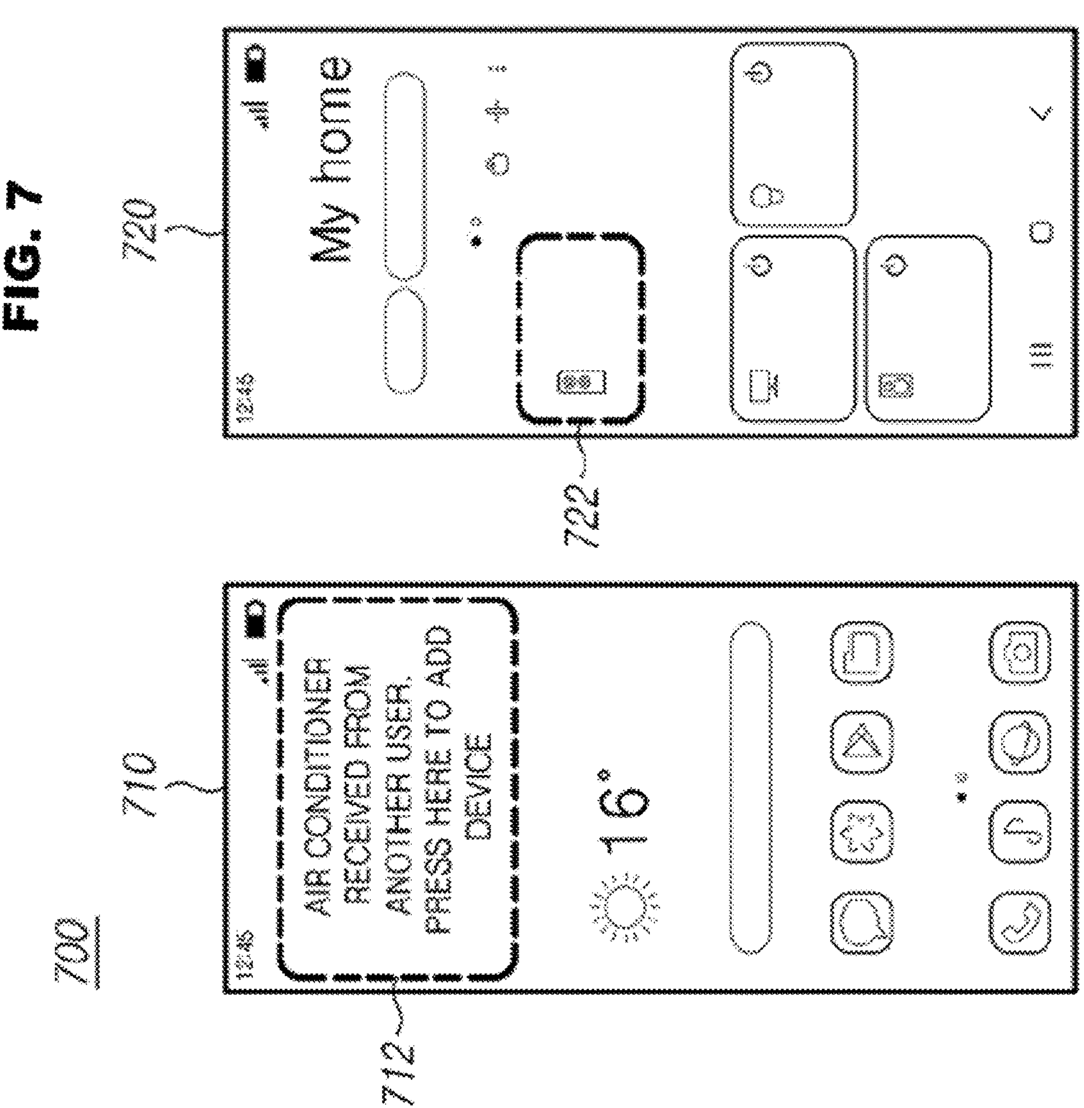

FIG. 7 illustrates an example user interface for registering an IoT device according to an embodiment. The user interface of FIG. 7 may be an example of the user interface displayed in operation 420 of the second device 402 of FIG. 4. The user interface illustrated in FIG. 7 may represent a user interface according to execution of an application corresponding to the application illustrated in FIG. 6. What has been described in connection with FIG. 6 may be omitted.

According to an embodiment, the user interface 700 may be a user interface displayed when an application for using an IoT service is executed on the user device (e.g., a smartphone).

In an embodiment, the user interface 700 may include a user interface 710, a user interface 720, and a user interface 730.

In an embodiment, when the electronic device receives the device change request (operation 416) from the IoT server, the user interface 710 may display a first object 712 indicating that the device change request has been received. For example, the first object 712 may be displayed in the form of an SMS, a pop-up window, or the like.

In an embodiment, although not illustrated in the drawings, if an application for an IoT service is not installed on the electronic device, the first object 712 may display a URL address for leading to installation of the application.

In an embodiment, when the electronic device identifies the user input through the first object 712, the electronic device may display the user interface 720.

In an embodiment, the user interface 720 may include a second object 722 indicating an IoT device corresponding to the device change request.

In an embodiment, when the electronic device receives a user input through the second object 722, the electronic device may perform an operation (e.g., operation 420, 422, 424, 428, and 430 of FIG. 4) for registering an IoT device.

In an embodiment, when registration of the IoT device is completed, the electronic device may display the user interface 730.

In an embodiment, the user interface 730 may include a third object 734 indicating a registered IoT device and a fourth object 732 for receiving a user input for leading to use of the registered IoT device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of operating an Internet-of-things (IoT) device, the method comprising:
- receiving a device change request from an IoT server;
- based on the receiving of the device change request, releasing a connection between the IoT device and a first device;
- based on the releasing of the connection between the IoT device and the first device, switching an operation of the IoT device to a pairing mode to establish a wireless communication link;
- establishing a wireless communication link between the IoT device and a second device while the IoT device is in the pairing mode;
- identifying whether the second device is associated with the device change request; and
- receiving information about an access point (AP) connecting the second device and the IoT server from the second device based on the second device being identified as being associated with the device change request.

2. The method of claim 1, wherein the device change request includes information about the second device, and
- wherein the information about the second device includes identification information about the second device and information about an account of a user of the second device.

3. The method of claim 2, further comprising disconnecting the IoT server and the IoT device based on the switching of the operation of the IoT device to the pairing mode.

4. The method of claim 3, further comprising deleting information about the first device that is stored in the IoT device based on the switching of the operation of the IoT device to the pairing mode.

5. The method of claim 3, further comprising periodically transmitting an advertising packet to at least one adjacent device based on the switching of the operation of the IoT device to the pairing mode.

6. The method of claim 1, further comprising:
- receiving a Bluetooth connection request from the second device; and
- transmitting a Bluetooth connection acknowledgment (ACK) to the second device.

7. The method of claim 6, wherein the identifying of whether the second device is associated with the device change request is based on information about the second device included in the Bluetooth connection request received from the second device and information about the second device included in the device change request.

8. An Internet of Things (IoT) device, comprising:
- a memory;
- a communication unit;
- at least one processor electrically connectable to the memory and the communication unit, wherein the at least one processor is configured to:
  - receive a device change request from an IoT server;
  - disconnect a connection between an IoT device and a first device based on the receiving of the device change request;
  - switch an operation of the IoT device to a pairing mode to establish a wireless communication link based on the disconnection of the connection between the IoT device and the first device;
  - establish a wireless communication link between the IoT device and a second device while the IoT device is in the pairing mode;
  - identify whether the second device is associated with the device change request; and
  - receive information about an access point (AP) connecting the second device and the IoT server from the second device based on the second device being identified as being associated with the device change request.

9. The electronic device of claim 8, wherein the device change request includes information about the second device, and
- wherein the information about the second device includes identification information about the second device and information about an account of a user of the second device.

10. The electronic device of claim 9, wherein the at least one processor is configured to disconnect the IoT server and the IoT device based on the switching of the operation of the IoT device to the pairing mode.

11. The electronic device of claim 10, wherein the at least one processor is configured to delete information about the first device stored in the electronic device based on the switching of the operation of the IoT device to the pairing mode.

12. The electronic device of claim 10, wherein the at least one processor is configured to periodically transmit an advertising packet to at least one adjacent device based on the switching of the operation of the IoT device to the pairing mode.

13. The electronic device of claim 8, wherein the at least one processor is configured to:

receive a Bluetooth connection request from the second device; and transmit a Bluetooth connection acknowledgment (ACK) to the second device.

14. The electronic device of claim 13, wherein the at least one processor is configured to identify whether the second device is associated with the device change request based on information about the second device included in the Bluetooth connection request received from the second device and information about the second device included in the device change request.

* * * * *